(12) United States Patent
Clark

(10) Patent No.: US 6,957,868 B1
(45) Date of Patent: Oct. 25, 2005

(54) BOTTOM DUMP FARM CART

(76) Inventor: Garry Clark, 4349 Studley Rd., Mechanicsville, VA (US) 23116

( * ) Notice: Subject to any disclaimer, the term of this patent is extended or adjusted under 35 U.S.C. 154(b) by 0 days.

(21) Appl. No.: 10/942,058

(22) Filed: Sep. 16, 2004

Related U.S. Application Data

(63) Continuation-in-part of application No. 10/455,157, filed on Jun. 6, 2003, now Pat. No. 6,796,615.

(51) Int. Cl.$^7$ .............................. B60P 1/56; B61D 7/02
(52) U.S. Cl. ...................................... 298/29; 298/35 R
(58) Field of Search .............................. 298/24, 25, 27, 298/29, 31, 32, 33, 35 R, 37, 38, 1 B; 296/25, 296/56, 180, 183.2; 414/467, 469, 520

(56) References Cited

U.S. PATENT DOCUMENTS

| | | | |
|---|---|---|---|
| 1,419,769 A | * | 6/1922 | Scherl et al. ............... 105/243 |
| 1,540,812 A | * | 6/1925 | Smalley .................... 298/35 R |
| 3,076,680 A | * | 2/1963 | Kress ....................... 298/35 M |
| 3,298,745 A | * | 1/1967 | Czapiewski ................. 298/37 |
| 3,385,231 A | * | 5/1968 | Dorey ........................ 105/250 |
| 4,236,757 A | * | 12/1980 | Gregory ................... 298/22 C |
| 4,580,502 A | * | 4/1986 | Ritzl et al. .................. 105/240 |
| 4,844,292 A | * | 7/1989 | Lonardi et al. ............. 222/503 |
| 6,705,681 B2 | * | 3/2004 | Russ ........................... 298/29 |
| 6,796,615 B1 | * | 9/2004 | Clark ......................... 298/29 |

FOREIGN PATENT DOCUMENTS

| JP | 353007032 A | * | 1/1978 | .......... B62D 33/02 |
|---|---|---|---|---|
| JP | 353111970 A | * | 9/1978 | .......... B65G 65/62 |

* cited by examiner

*Primary Examiner*—H. Gutman
(74) *Attorney, Agent, or Firm*—Norman B. Rainer

(57) ABSTRACT

A bottom dump trailer cart which includes a cargo compartment having a floor equipped with downwardly pivoting dumping panels is constructed such that the panels protect the wheels from the dumped cargo. The cart is capable of riding over the dumped cargo because of the absence of an axle connecting wheels on opposite sides of the cart, and the provision of a rear wall of the compartment which can be caused to pivot upwardly and rearwardly. A tongue assembly extends forwardly of the cargo compartment. An operating mechanism having expanding hinges enables conversion between a dumping state wherein the dumping panels and rear wall are caused to be free-swinging, and a locked transport state wherein the dumping panels are upwardly secured and the rear wall is secured in a vertical position.

4 Claims, 6 Drawing Sheets

BOTTOM DUMP FARM CART

RELATED APPLICATIONS

This application is a Continuation-in-Part of U.S. patent application Ser. No. 10/455,157, Filed Jun. 6, 2003 now U.S. Pat. No. 6,796,615.

BACKGROUND OF THE INVENTION

1. Field of the Invention

This invention relates to a wheeled cargo-carrying vehicle, and more particularly concerns a trailer adapted to dump its cargo downwardly upon the ground in a single discharge.

2. Description of the Prior Art

Bottom dump vehicles or wagons are frequently used to transport a variety of dense bulk materials such as sand, gravel, salt, hot mix asphalt, coal, ores, and the like. One primary advantage of a bottom dump trailer or truck as opposed to a conventional hydraulic hoist dump truck is that there is no need for vertical elevation to discharge the cargo rearwardly. As such, bottom dump vehicles do not have the risks associated with conventional hydraulic hoist dump trucks such as interference with low electrical or telephone wires and the potential for tipping over due to vertical elevation of a hoisted cargo compartment. Another advantage is that bottom dump vehicles do not require expensive and failure-prone hydraulic systems employed in rear-dump hauling vehicles.

U.S. Pat. Nos. 3,183,852 and 3,558,190 disclose hopper cars having horizontally slideable gates or doors to control downward discharge of the contents of the hopper in order to produce an elongated windrow instead of a single large pile. One of the problems encountered with a single large pile is that the rear wheels of the vehicle ride on the sides of the pile, resulting in considerable damage to the sidewalls of the tires on said rear wheels. Also, the pile will impact against an axle associated with the rear wheels. Said sliding doors require expensive heavy duty motors for operation, and the doors are subject to rapid wear due to friction created by sliding interaction with the cargo material.

U.S. Pat. No. 6,386,818 to Reed and U.S. Pat. No. 3,917,084 to Swisher, et. al., disclose "live bottom" trailers which employ a horizontally oriented conveyor belt at the bottom of a cargo compartment to move the cargo rearwardly for controlled dumping to produce an elongated windrow.

Bottom dumping vehicles designed to discharge in a single dump farm products such cotton and hay are disclosed in U.S. Pat. Nos. 4,362,457 and 3,698,767, respectively. However, said vehicles are designed to discharge their loads as integrated or shaped structures, and do not confront the need to travel over the discharged load.

U.S. Pat. Nos. 1,540,812 and 6,705,681 disclose bottom dumping carts designed to discharge their cargo downwardly, and then travel over and away from the pile of dumped cargo. Such carts employ pivoted floor panels that can be released to swing downwardly by virtue of weight of the falling cargo. The rear wall of the cart is hingedly suspended to permit upward and rearward displacement by the pile of dumped cargo as the cart travels forwardly. Following the dumping step, operating means restore the cart to its cargo hauling state by raising and securing the floor panels, and securing the rear wall. Earlier disclosed operating means have, however, been of complex construction, difficult to operate, and lacking in durability.

It is accordingly an object of the present invention to provide a farm trailer cart that can dump a loose bulk cargo downwardly upon the ground in a single discharge pile and then be pulled over and away from said pile.

It is another object of this invention to provide means for operating a cart of the foregoing object, said operating means being easy and safe to use, of rugged construction and amenable to low cost manufacture.

These objects and other objects and advantages of the invention will be apparent from the following description.

SUMMARY OF THE INVENTION

The above and other beneficial objects and advantages are accomplished in accordance with the present invention by a bottom dump trailer cart comprising:

a) a cargo compartment defined by a front wall, paired sidewalls, a rear wall adapted to swing rearwardly and upwardly, and a floor having a pair of pivotably supported dumping panels adapted to swing downwardly to a dumping state which permits gravity discharge of the cargo content of the compartment, b) latching means for controllably preventing movement of said rear wall, c) at least one wheel positioned below each sidewall at a location that receives said panels in the dumping state, d) a tongue assembly extending forwardly of said front wall and having means for releasable attachment to a towing vehicle, and e) operating means which facilitate movement of said panels and latching means to produce said dumping state, and to produce a transport state wherein said panels are upwardly drawn to intercontacting abutment and said rear wall is secured in upright position by said latching means, f) said operating means comprising expanding hinges activated by pulling cables to force said dumping panels upwardly.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

DESCRIPTION OF THE PREFERRED EMBODIMENT

Figure 1:
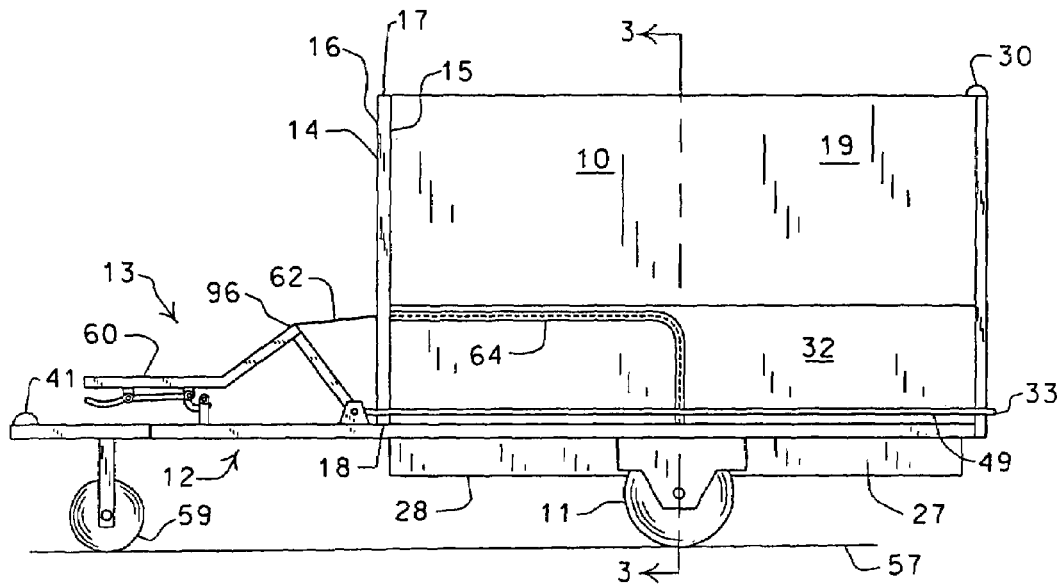
FIG. 1 is a right side view of an embodiment of the cart of this invention shown in its transport state of operation.

Referring now to FIGS. 1–8, an embodiment of the farm cart of the present invention is shown comprised of cargo compartment 10, side wheels 11 positioned below said cargo compartment on each side thereof, a tongue assembly 12 extending forwardly of said cargo compartment, and operating means 13 associated with said tongue assembly.

Cargo compartment 10 is comprised of front wall 14 having interior and exterior surfaces 15 and 16, respectively, and upper and lower extremities 17 and 18, respectively; opposed sidewalls 19 joined to front wall 14 in spaced apart relationship about longitudinal axis 20 and bounded in part by upper edges 22 which are straight, parallel, and horizontally coplanar. The lower regions of said sidewalls are comprised of opposed downwardly convergent portions 32 which facilitate complete dumping of the contents of the cargo compartment. Said convergent portions 32 terminate in straight lower edges 26. Said sidewalls extend longitudinally to rear extremities 23. A rear wall 29 is supported by pivot means 30 associated with the upper edges 22 of said sidewalls adjacent rear extremities 23, and is capable of swinging movement rearwardly and upwardly. Said front wall and sidewalls are supported by a U-shaped frame 37 which is open beneath said rear wall. The consequence of said U-shaped frame is that there is no portion of the frame which, at the rear of the cart is transversely disposed between said sidewalls.

Figure 3:
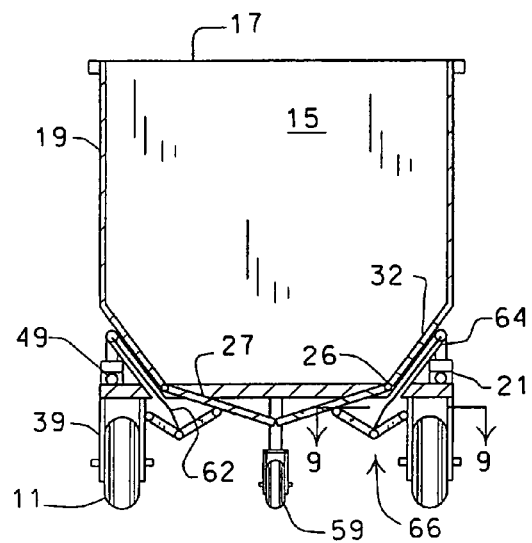
FIG. 3 is a sectional view taken in the direction of the arrows upon the line 3—3 of FIG. 1.
Figure 4:
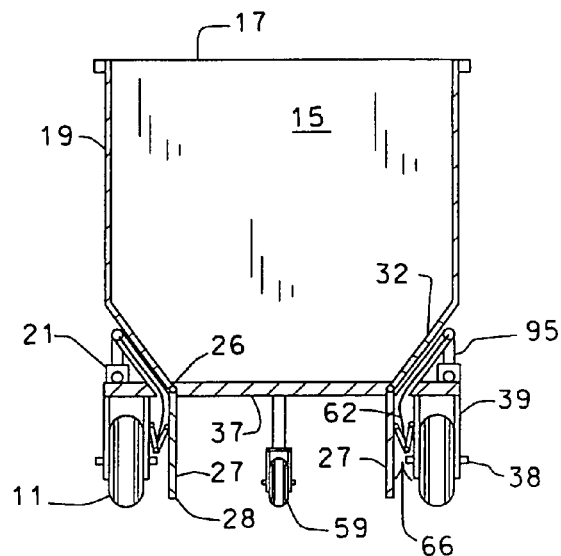
FIG. 4 is a sectional view taken in the direction of the arrows upon the line 4—4 of FIG. 2.
Figure 5:
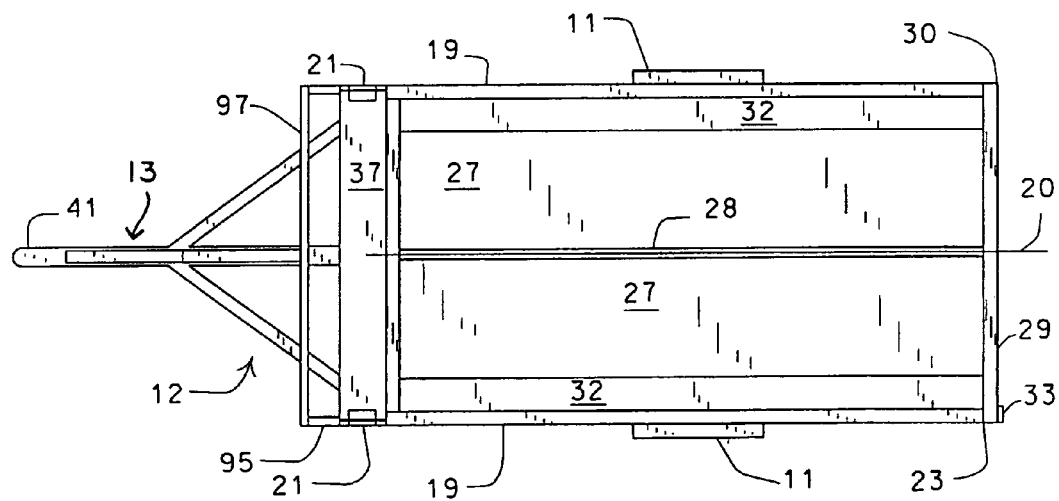
FIG. 5 is a top view of the embodiment of FIG. 1.
Figure 6:
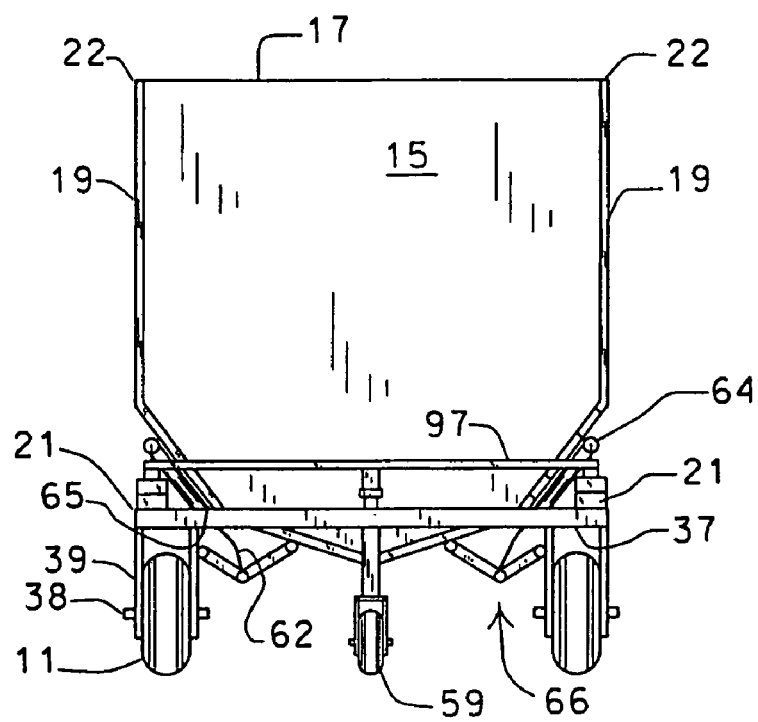
FIG. 6 is a front view of the embodiment of FIG. 1.
Figure 7:
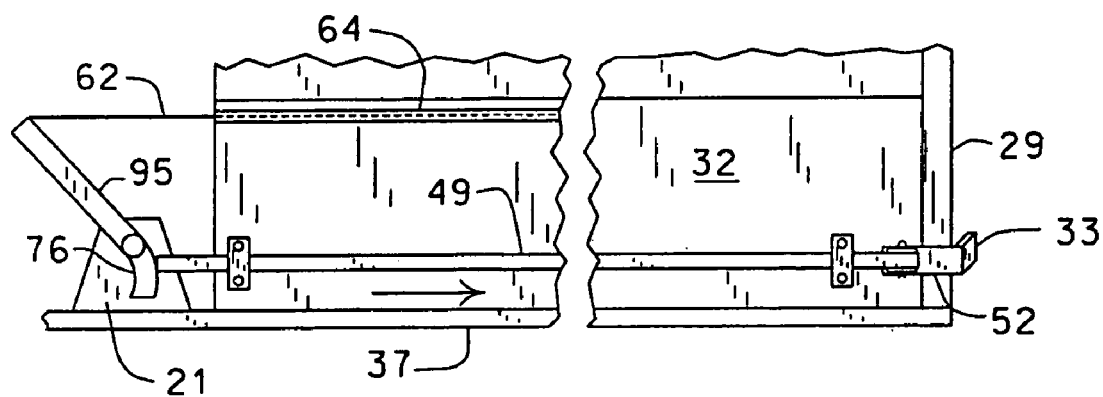
FIG. 7 is an enlarged fragmentary schematic side view showing the operating mechanism of the cart of FIG. 1.
Figure 8:
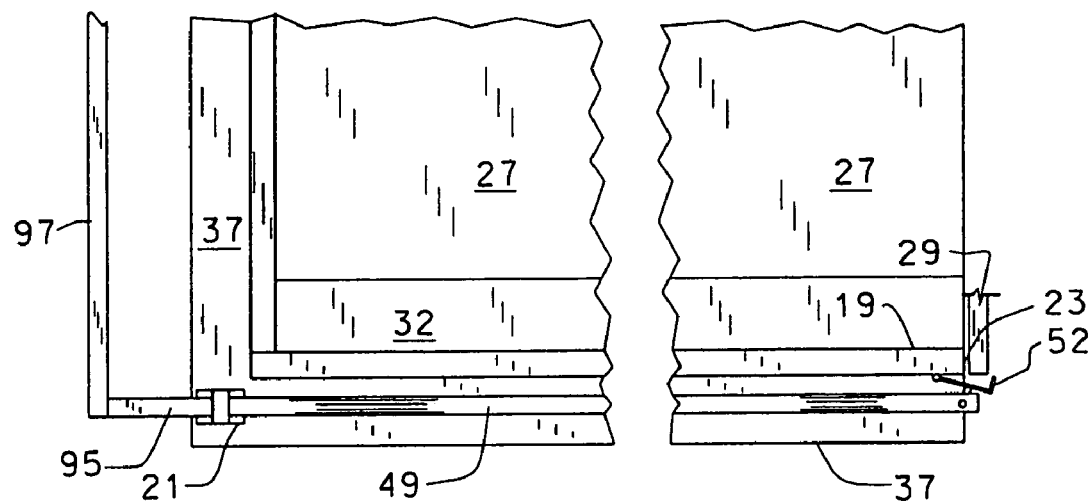
FIG. 8 is a top view of the schematic view of FIG. 7.
Figure 9:
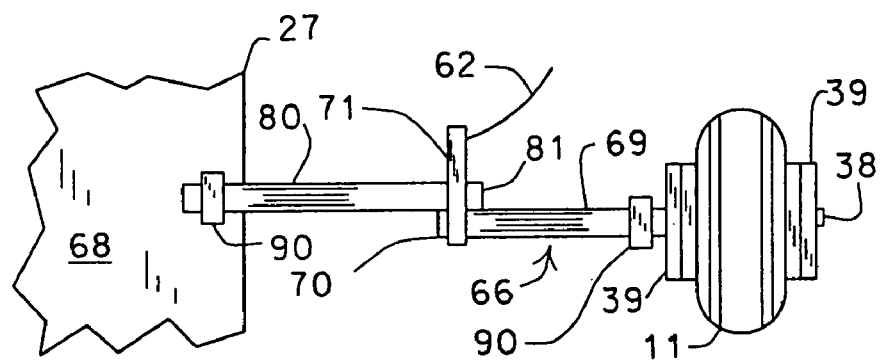
FIG. 9 is a fragmentary top view taken in the direction of the arrows upon the line 9—9 of FIG. 3.

A floor is comprised of a pair of dumping panels 27 elongated between said front and rear walls, pivotally supported by edges 26, and extending to straight distal extremities 28. Said dumping panels are adapted to swing toward and away from each other in a path orthogonal to axis 20. A non-dumping or closed transport state is achieved when said distal extremities are in contacting abutment, as best shown in FIG. 3. A dumping state is achieved when panels 27 are separated and downwardly directed, as best shown in FIG. 4.

Latching means 33 are interactive with rear wall 29 in a manner to secure said rear wall in upright position in abutment with the rear extremities 23 of said sidewalls and the rear extremities of panels 27, thereby closing said cargo compartment.

Figure 2:
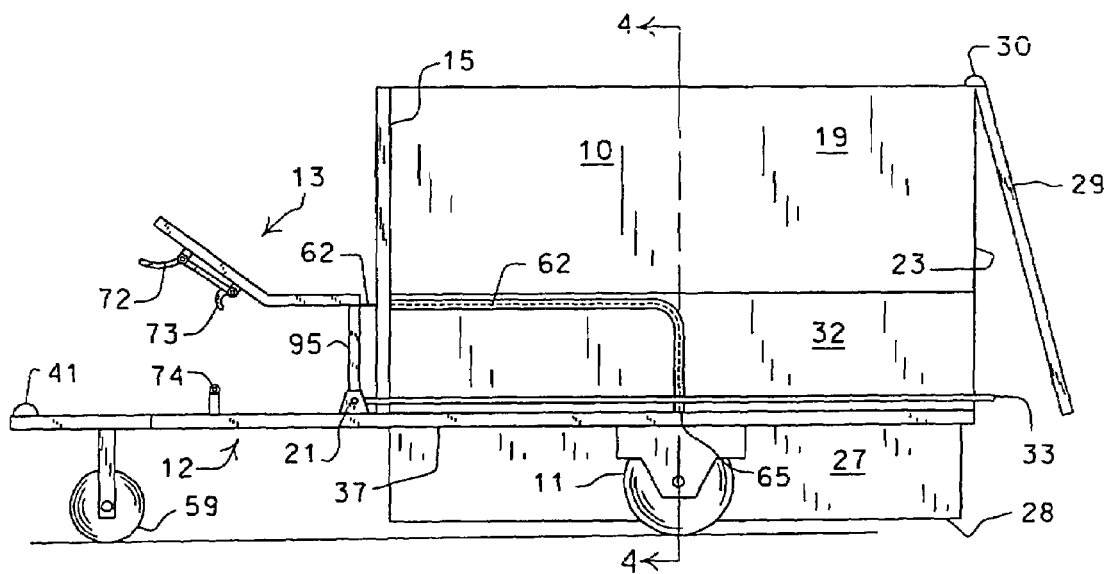
FIG. 2 shows the embodiment of FIG. 1 in the dumping state of operation.

When the latching means are controllably released from engagement with said rear wall, the rear wall becomes free swinging, and can move rearwardly and upwardly. This is a feature of the dumping state, as best shown in FIG. 2. In operation, when the cargo is allowed to fall by gravity effect directly upon the ground below the cart, a single pile is produced. The height of the pile may well be above the level of frame 37. Consequently, the pivotable nature of the unlatched rear wall permits rearward and upward motion by contact with the top of the pile when the cart is advanced. By virtue of such effect, forward motion of the cart will not be impeded by the dumped pile. Typical cargos suitable for handling by the cart of this invention include top soil, manure, hay, feed and agricultural products.

Side wheels 11 are positioned below each sidewall. Each side wheel is rotatable upon an individual axle 38 within a holding yoke 39 in a manner such that no axle spans the cart below the cargo compartment. By virtue of said individual axles and consequent absence of a spanning axle, and the absence of a transverse rear frame member, there is no obstruction to a dumped pile of cargo. Accordingly, the cart can be advanced over the pile. Said wheels are positioned in a manner such that panels 27, when in the dumping state as shown in FIG. 4, protect the wheels from interaction with the pile of dumped cargo. Such protection of the wheels in the dumping state is further achieved by virtue of the fact that the width of panels 27, measured between distal extremity 28 and supporting edge 26 is substantially equal to the distance between frame 37 and the receiving ground surface 57.

Tongue assembly 12 extends forwardly from front wall 14 as an extension of frame 37. The forward extremity of said tongue assembly contains hitching means 41 for releasable attachment to a towing vehicle. A forward wheel 59 is positioned below said tongue assembly and centered upon axis 20.

An embodiment of operating means 13 is shown pivotably supported by paired brackets 21 mounted upon the front portion of frame 37 and disposed beneath sidewalls 19. An operating arm 95 is pivotably joined to each bracket 21, and extends to an upper extremity 96. A cross bar 97 extends laterally between each extremity 96 in joinder therewith. An extender rod 98 is attached to the center of cross bar 97 and forwardly directed upon axis 20. An actuating lever 60 joins extender rod 98 at an obtuse angle therewith.

Paired pulling cables 62 are attached to the upper extremities 96 of arms 95, and extend through tubular conduits 64 disposed upon the exterior of each sidewall and terminate in extremities 65 located adjacent each side wheel 11.

An expanding hinge 66 is pivotably secured to the inside of the yoke 39 of each side wheel, and extends to pivoted engagement with the underside 68 of the associated dumping panel 27. Said hinge is comprised of a first arm 69 extending downwardly from pivot means 90 on said yoke to a distal extremity 70, and a second arm 80 joined by pivot means 90 to underside 68 and having a lowermost extremity 81 joined by pivot pin 71 to the distal extremity of said first arm. The terminal extremity of each cable 62 is attached to pivot pin 71. By virtue of such construction, when cable 62 is pulled upwardly, it causes hinge 66 to expand laterally in a scissor-like movement which pushes the associated panel 27 upwardly. Such upward pulling of the cable is produced when actuating lever 60 is forced downwardly.

Locking means are associated with the forward portion of actuating lever 60 to keep said lever in its downward position. As best shown in FIGS. 1 and 2, an embodiment of said locking means is shown comprised of pivoted handgrip 72 interactive with pivoted hook 73. A loop 74, attached to the tongue assembly is adapted to engage hook 73 in the downwardly secured state of lever 60. An actuating tab 76 is attached to the lowermost, pivoted extremity of the right side operating arm 95 and adapted to force coupling rod 49 rearwardly when lever member 60 is in the lowermost position. Such action causes hinge 52 to secure said rear wall.

When lever member 60 is released, permitting upward movement thereof, the weight of panels 27 plus the weight of the cargo causes said panels to swing downwardly to dump the cargo. Spring biasing means may be employed to drive rod 49 forwardly to produce said open state.

An alternative embodiment of the expanding hinge employed in the cart of the present invention is illustrated in FIGS. 10–13 and denoted by numeral 83. Said alternative hinge 83, which provides improved efficiency of operation, includes a vertically elongated actuating bar 84. The distal extremity of cable 62 is attached to the upper extremity of bar 84. A vertically elongated slot 85 centered within bar 84 slideably accommodates pivot pin 71 which interconnects said first and second arms 69 and 80, respectively. Said arms, supported by pivot means 90, are spaced apart sufficiently to slideably embrace opposite sides of bar 84. A fulcrum rod 86 is orthogonally secured to bar 84 adjacent the lowermost extremity thereof.

Figure 11:
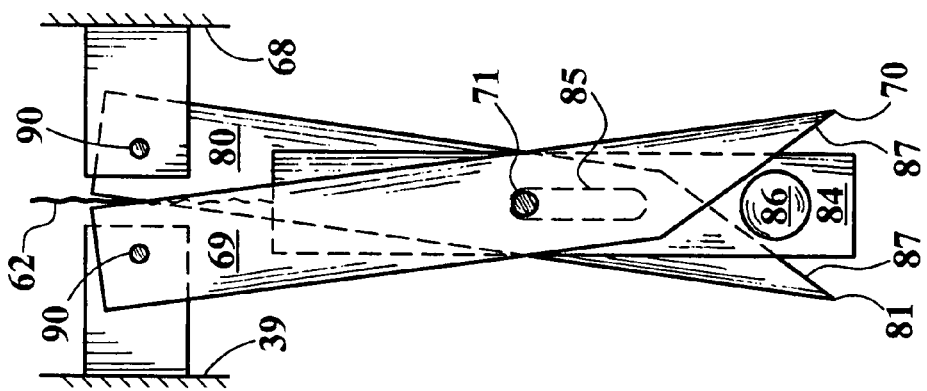
FIG. 11 is a rear view of the alternative embodiment of expanding hinge component of FIG. 10 shown in the dumping state of said cart.
Figure 10:
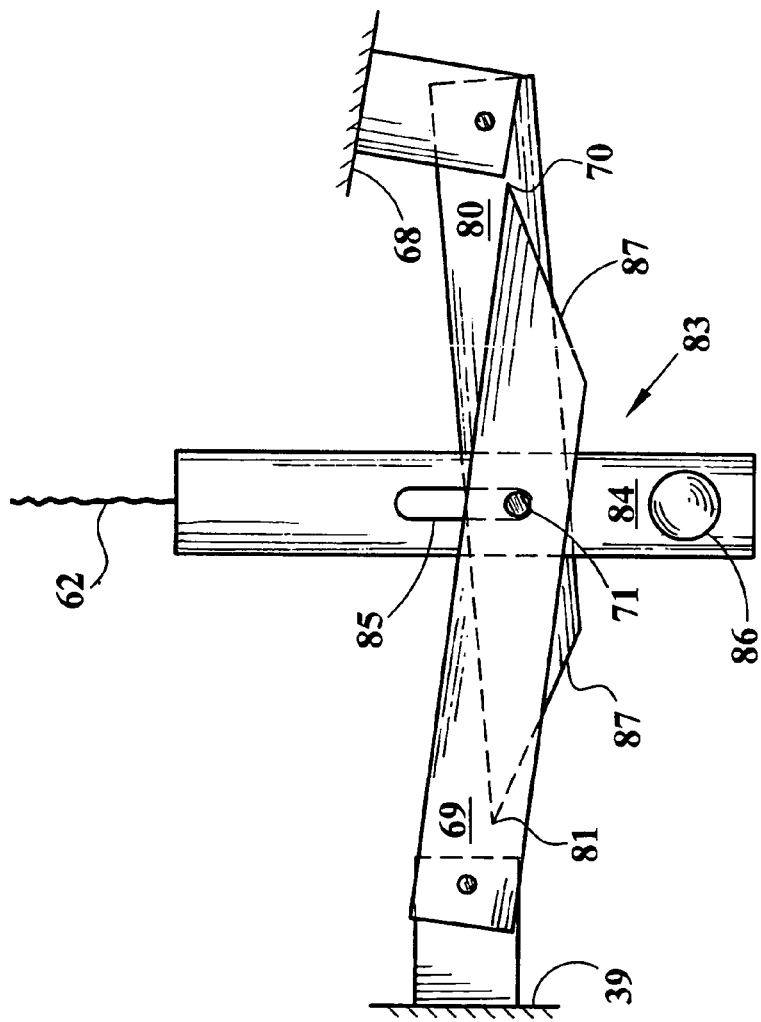
FIG. 10 is a rear view of an alternative embodiment of expanding hinge component useful in the cart embodiment of FIG. 1 and shown in the transport state of said cart.
Figure 13:
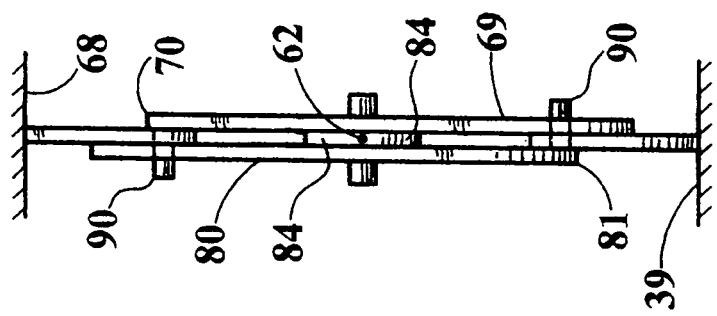
FIG. 13 is a top view of the alternative embodiment of expanding hinge shown in FIG. 12.
Figure 12:
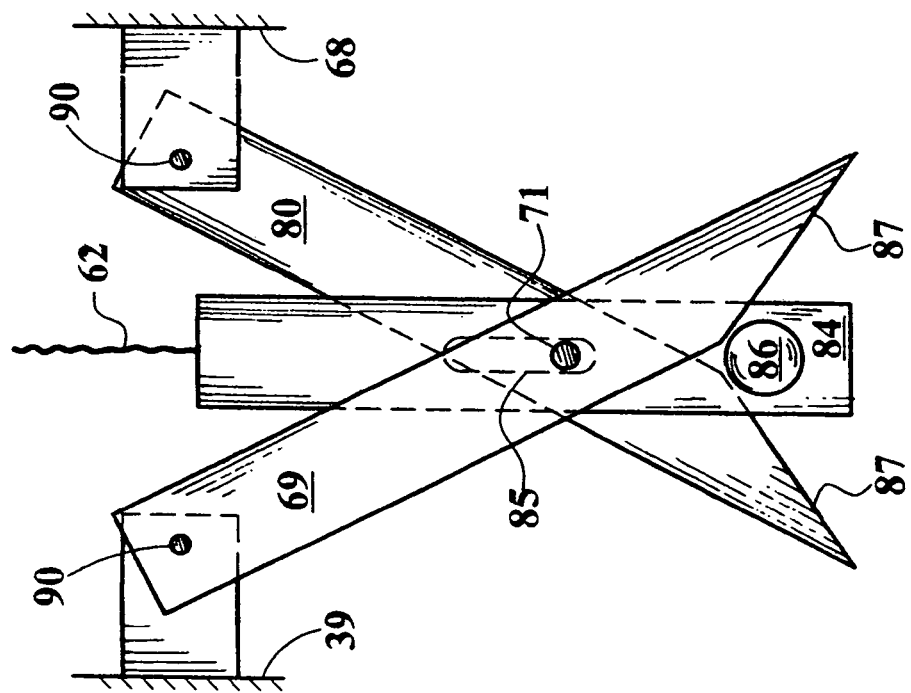
FIG. 12 is a rear view of the alternative embodiment of expanding hinge component of FIG. 10 shown in an intermediate state of operation.

In operation, when pulling force is applied by cable 62 to actuating bar 84, hinge 83 begins to expand from the folded configuration shown in FIG. 11 that it has in the dumping state of the cart. As bar 84 is raised, fulcrum rod 86 acts against oppositely facing angled edges 87 of said arms, forcing them apart in a scissor-like motion. With continued upward movement of bar 84, pivot pin 71 slideably descends within slot 85, and the pointed extremities 70 and 81 of said arms are drawn to substantially horizontally opposed positions, causing dumping panel 27 to be in the closed or transport state of the cart, as shown in FIG. 10.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. A bottom dump trailer cart comprising:
   a) a cargo compartment defined by a front wall, paired sidewalls, a rear wall adapted to swing rearwardly and upwardly, and a floor having a pair of pivotably supported dumping panels adapted to swing downwardly to a dumping state which permits gravity discharge of the content of said cargo compartment,
   b) latching means for controllably preventing movement of said rear wall,
   c) at least one wheel positioned below each sidewall at a location that receives said panels in the dumping state,
   d) a tongue assembly extending forwardly of said front wall and having means for releasable attachment to a towing vehicle, and
   e) operating means which facilitate movement of said panels and latching means to produce said dumping state, and to produce a transport state wherein said panels are upwardly drawn to intercontacting abutment and said rear wall is secured in upright position by said latching means,
   f) said operating means comprising paired pulling cables attached to a lever member located forwardly of said front wall, and an expanding hinge located beneath each dumping panel and comprised of two elongated arms interconnected by pivot means whereby upward force applied to said pivot means by an associated pulling cable activated by said lever causes scissor-like lateral separation of said arms to force the associated dumping panel upwardly to produce said transport state.

2. The cart of claim 1 further comprising tubular conduits through which said cables extend in their passage between said lever member and each expanding hinge.

3. The cart of claim 1 further comprised of a vertically elongated member slideably disposed between said arms and slideably engaging said pivot means.

4. The cart of claim 3 wherein said actuating member has a fulcrum adapted to force apart said arms.

* * * * *